United States Patent
Short et al.

(10) Patent No.: US 7,461,847 B2
(45) Date of Patent: Dec. 9, 2008

(54) SELF CENTERING, FLOATING BRUSH SEAL ASSEMBLY

(75) Inventors: John Short, Smithfield, RI (US); Charles Trabert, Warwick, RI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/299,458

(22) Filed: Dec. 12, 2005

(65) Prior Publication Data
US 2007/0132189 A1   Jun. 14, 2007

(51) Int. Cl.
*F16J 15/44* (2006.01)
*F01D 25/16* (2006.01)

(52) U.S. Cl. ...................... 277/355; 415/231
(58) Field of Classification Search ............... 277/355; 415/231
See application file for complete search history.

(56) References Cited
U.S. PATENT DOCUMENTS

| 5,351,971 A | 10/1994 | Short |
| 5,474,305 A | 12/1995 | Flower |
| 5,752,805 A | 5/1998 | Gail et al. |
| 5,997,004 A * | 12/1999 | Braun et al. ............... 277/352 |
| 6,168,162 B1 | 1/2001 | Reluzco et al. |
| 6,254,344 B1 * | 7/2001 | Wright et al. ............. 415/231 |
| 6,416,057 B1 * | 7/2002 | Adams et al. ............. 277/355 |
| 6,799,766 B2 * | 10/2004 | Crudgington et al. ..... 277/355 |

* cited by examiner

*Primary Examiner*—Vishal Patel
(74) *Attorney, Agent, or Firm*—Dykema Gossett PLLC

(57) ABSTRACT

A self centering, floating brush seal assembly for a machine housing including a seal channel disposed circumferentially about a rotating shaft. The seal channel is typically configured to accommodate a ring seal. The ring seal is removed and a radially floating brush seal is installed in the seal channel but the brush seal is not fixed to the machine housing. The typical brush seal includes a front plate, a back plate, and a plurality of bristles sandwiched between the front plate and the back plate and having free radially extending ends disposed circumferentially about and contacting the rotating shaft. A radially extending rub feature is associated with at least one of the front plate and the back plate. The rub feature is disposed circumferentially about and contacts the rotating shaft.

16 Claims, 3 Drawing Sheets

SELF CENTERING, FLOATING BRUSH SEAL ASSEMBLY

FIELD OF THE INVENTION

This subject invention relates to seals typically disposed about a rotating shaft and, in particular, a new brush seal.

BACKGROUND OF THE INVENTION

Brush seals typically include bristles sandwiched between front and back plates. Typically, the brush seal is fixed to a machine housing via some structure and the bristles contact a rotating shaft within the machine housing to seal a high pressure area with respect to a low pressure area. Brush seals are typically used in compressors, gas and steam turbines, and pumps.

In order to accommodate shaft eccentricity which can cause leakage and bristle wear, advanced brush seals allow the brush seals to move radially with respect to a brush seal housing which is fixed to the machine housing.

Still, many machines were designed with carbon ring seals instead of brush seals. In such a machine, replacing a carbon ring seal with a brush seal requires modification of the machine housing and/or additional brush seal structure in order to fix the brush seal to the machine housing.

U.S. Pat. No. 5,351,971, for example, discloses a brush seal with bristles sandwiched between a squeeze plate and a side plate. The brush seal back plate is free to move radially with respect to the squeeze plate to accommodate shaft eccentricity. This subassembly is housed in a retaining washer fixed to the machine housing. A low friction coating is applied to the inside diameter of the back plate to reduce friction between the back plate and the rotating shaft should they come into contact. Should the shaft move in the radial direction, only the back plate will move. The sealing surface at the bristle inside diameter will not move to center itself with respect to the shaft. Also, such a brush seal cannot be easily installed in a machine housing designed to accommodate a ring seal without modifying the machine housing.

U.S. Pat. No. 5,474,305 discloses a brush seal with bristles sandwiched between front and back plates disposed in a housing bolted to the machine housing. A wave spring between the brush seal and its housing urges the brush seal bristles towards the rotating shaft and centers the brush seal about the shaft. In this design, the brush seal back plate may include a rubbing surface in case the back plate contacts the rotating shaft. Such a brush seal, however, cannot be installed in a machine housing designed to accommodate a ring seal without modifying the machine housing. Also, the wave spring assembly can be fairly complex. Both of the above patents are hereby incorporated herein by this reference.

SUMMARY OF THE INVENTION

It is therefore an object of this invention to provide a brush seal designed to be more easily inserted in machinery configured to accommodate ring seals.

It is a further object of this invention to provide such a brush seal which does not require modifications to the machinery housing.

It is a further object of this invention to provide such a brush seal which centers itself about the rotating shaft.

It is a further object of this invention to provide such a brush seal which reduces leakage across the brush seal.

It is a further object of this invention to provide a floating brush seal which reduces bristle wear and extends bristle life.

The subject invention results from the realization that a brush seal can be more easily inserted into a machine housing configured for a ring seal if the brush seal is designed to center itself with respect to the shaft instead of the machine or brush seal housing allowing the brush seal to float in order to maintain shaft eccentricity. Such an approach reduces leakage across the seal and extends bristle life by reducing the offset interference on the bristles.

The subject invention, however, in other embodiments, need not achieve all these objectives and the claims hereof should not be limited to structures or methods capable of achieving these objectives.

This invention features a self centering, floating brush seal assembly. A machine housing includes a seal channel disposed circumferentially about a rotating shaft. The seal channel is typically designed to accommodate a ring seal. The ring seal is removed and a radially floating brush seal is disposed in the seal channel but not fixed to the machine housing. The typical brush seal includes a front plate, a back plate, and a plurality of bristles sandwiched between the front plate and the back plate and having free radially extending ends disposed circumferentially about and contacting the rotating shaft. A radially extending rub feature is associated with at least one of the front plate and the back plate, typically the back plate. The rub feature is also disposed circumferentially about and contacts the rotating shaft.

In one example, the rub feature is a ring attached to the back plate but the rub feature may also be segmented. The rub feature can be made of a material exhibiting good tribological properties as carbon, Teflon, or a plastic or other low friction materials. In one example, the back plate includes an inner diameter channel and the rub feature is disposed in the channel. The rub feature may also be integral with the back plate. Typically, the rub feature extends to or closely proximate to the free ends of the bristles. In one example, the back plate includes a face with low friction material. The rub feature may even extend over a side of the back plate.

In one example, the brush seal is segmented to facilitate assembly about a shaft. There may be an outer diameter groove in the brush seal and a spring disposed in the groove for securing the segments together. Preferably, the interface between seal segments includes a curved portion to align the segments. An antirotation tab may also be included on the brush seal.

One self centering brush seal in accordance with the subject invention consists essentially of a front plate, a back plate, a plurality of bristles sandwiched between the front plate and the back plate and having free radially extending ends, and a radially extending rub feature associated with at least one of the front plate and the back plate. That is, there is no brush seal housing which would require modifications to be made to the machine housing in order to install the brush seal.

This invention also features a method of retrofitting a machine configured to accommodate a ring seal to include a brush seal. The method includes removing the ring seal from its channel in the machine and installing the self centering, floating brush seal described above in the channel. No brush seal housing is needed and the machine channel need not be modified to accept the brush seal.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
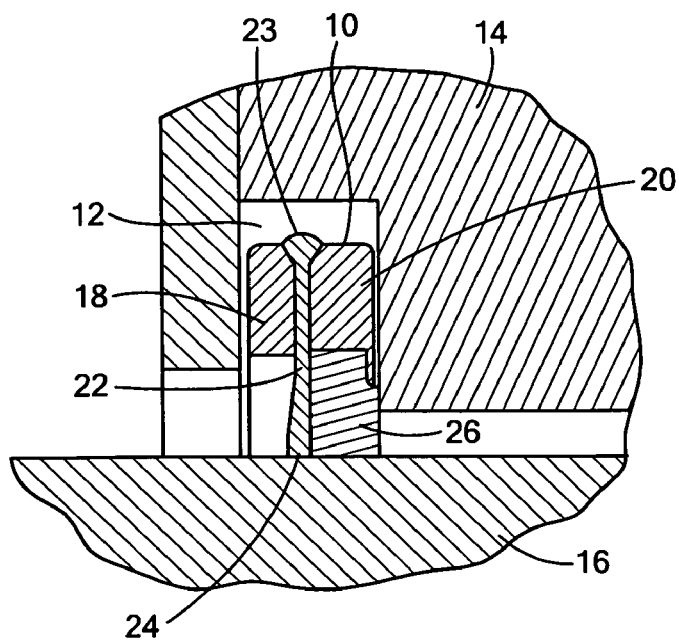
FIG. 1 is a schematic cross-sectional view of one example of a self centering floating brush seal assembly in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts brush seal 10 floating in circumferential seal channel 12 in machine housing 14 about shaft 16. Seal channel 12 was designed to accommodate a carbon ring seal and the carbon ring seal has been removed and replaced with brush seal 10. Note the lack of a brush seal housing fixed to machine housing 14 eliminating the need for modifications to machine housing 14. Thus, the preferred brush seal of the subject invention consists essentially of front plate 18, back plate 20, bristles 22 sandwiched between front plate 18 and back plate 20 and having free radially extending ends 24. Radially extending rub feature 26 is associated with front plate 18 and/or back plate 26 and there is no brush seal housing.

Most brush seals are hard mounted to the machine structure by locating a feature on the brush seal cooperating with a feature on the machine structure. The locating feature on the machine structure has a concentricity tolerance with respect to the rotational centerline of the shaft the seal engages. Such a brush seal can accommodate a small amount of eccentricity between the seal and the rotating shaft but, beyond a certain amount, the sealing ability of the brush seal is compromised. In addition, the eccentricity between the shaft and the structure can change during machine operation due to thermal and centrifugal effects. If the eccentricity between the shaft and the bristle inside diameter exceeds the bristle interference, a gap will open up around a portion of the seal resulting in an increase in leakage. In addition, excessive interference can cause increased bristle wear due to high contact pressure.

In sharp contrast, brush seal 10 centers with respect to shaft 16 instead of machine housing 14 allowing the brush seal to float in order to maintain shaft concentricity. This design approach reduces leakage across the seal and extends bristle life by reducing the offset interference on the bristles. Floating brush seal 10 thus centers itself with respect to shaft 16 instead of housing 14 allowing brush seal 10 to float. Brush seal 10 includes front plate 18, back plate 20, and bristles 22 sandwiched therebetween via weld 23 with bristle end 24 disposed circumferentially about and contacting shaft 16. A rub feature is associated with either front plate 18 or back plate 20, or both plates, to center brush seal 10 in seal channel 12 with respect to shaft 16. In FIG. 1, rub ring 26 is attached to the inside diameter of back plate 20 and may be made of carbon, Teflon, a plastic material, or any other material that exhibits good tribological properties. Rub ring 26 facilitates brush seal centering by allowing contact of brush seal 10 with shaft 16 while rotating without sustaining damage to the shaft or ring material. Slight axial and radial clearances maintained between brush seal 10 and channel 12 to allow free radial movement of brush seal 10. Radial movement of rotating shaft 16 causes contact between the shaft and rub material 26 forcing brush seal 10 to follow the shaft movement and maintain a more centered position. The radial clearance between the inside diameter of rub material 26 and the surface of the shaft is typically on the order of 0.010". Thus, the inside diameter of rub material 26 extends to or closely proximate to the free ends 24 of bristles 22.

Figure 2:
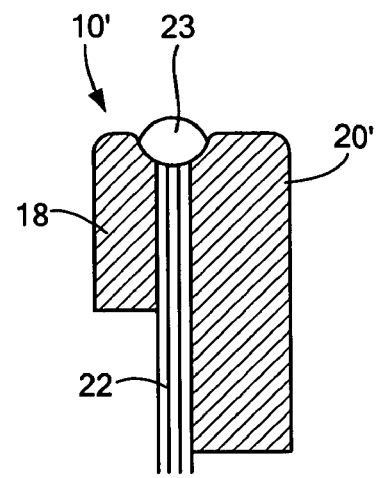
FIG. 2 is a schematic cross-sectional view of another embodiment of a floating brush seal in accordance with the subject invention.

Brush seal 10', FIG. 2 also includes bristles 22 and front plate 18 but now the entirety of back plate 20' is made of carbon, Teflon, or some other material with good tribological properties. Thus, in this design, the rub feature is integral with back plate 20'.

Figure 3:
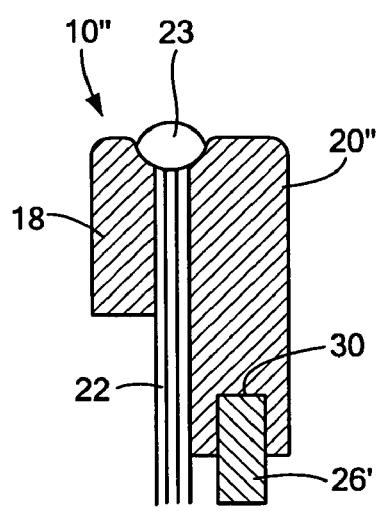
FIG. 3 is a schematic cross-sectional view of still another embodiment of a brush seal in accordance with the subject invention.
Figure 4:
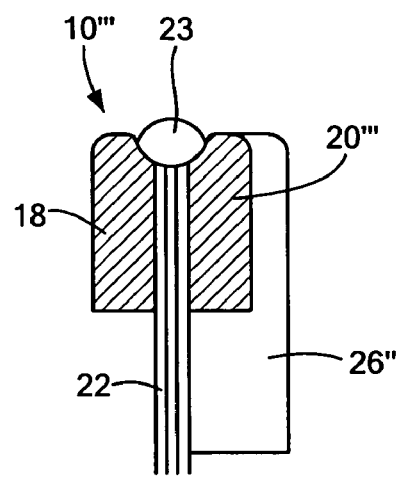
FIG. 4 is a schematic cross-sectional view of another embodiment of a brush seal in accordance with the subject invention.

Brush seal 10", FIG. 3 includes back plate 20" with inner diameter channel 30 which receives rub segment 26'. In FIG. 4, brush seal 10''' includes rub feature 26" incorporated into back plate 20''' and extending up over the outside of back plate 20" as shown.

Figure 6:
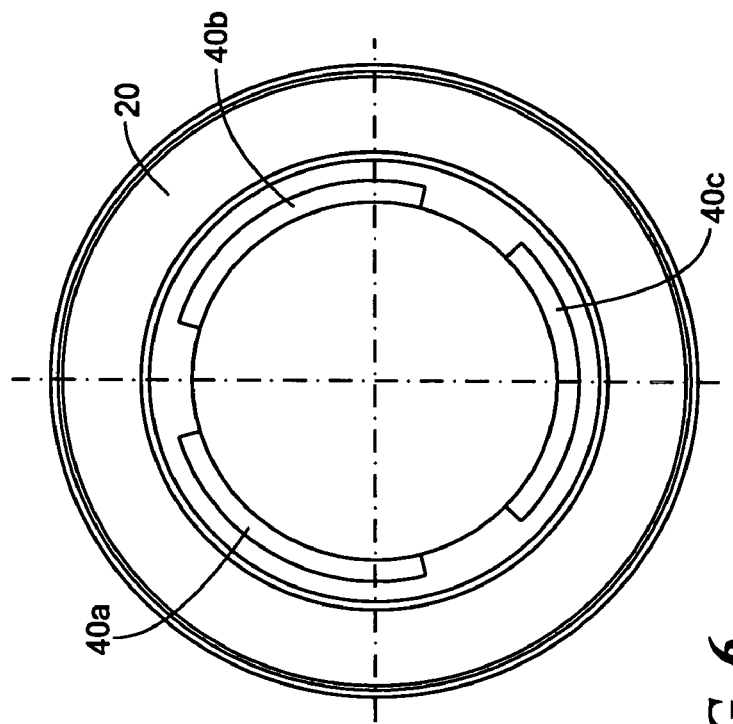
FIG. 6 is a schematic front view of a brush seal in accordance with the subject invention with three rub pad segments.
Figure 5:
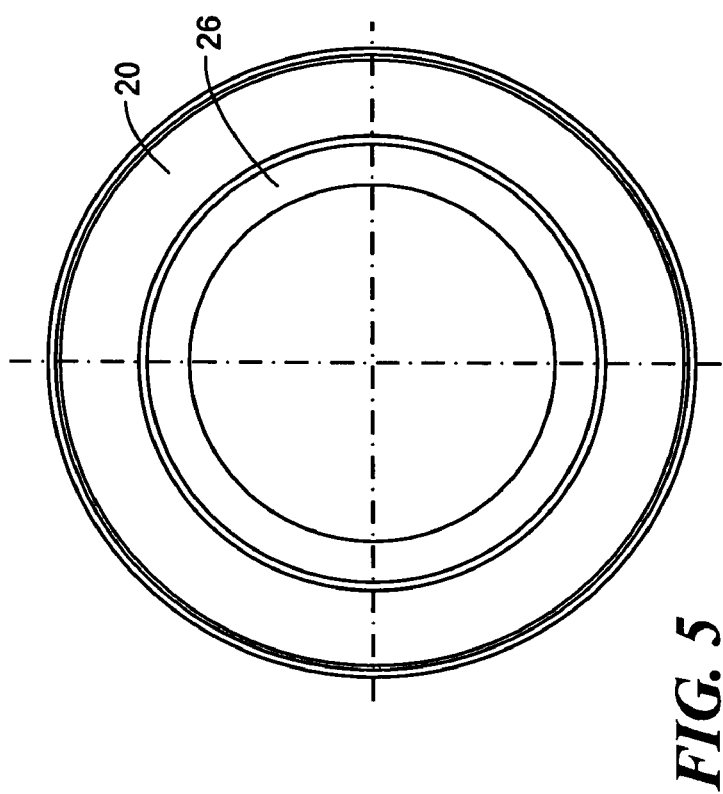
FIG. 5 is a schematic front view of the brush seal shown in FIG. 1.

In one embodiment, brush seal 10, FIG. 1 includes continuous rub ring 26 shown in FIG. 5. In FIG. 6, the rub feature is in the form of three rub pads 40a-40c attached to back plate 20.

Figure 8:
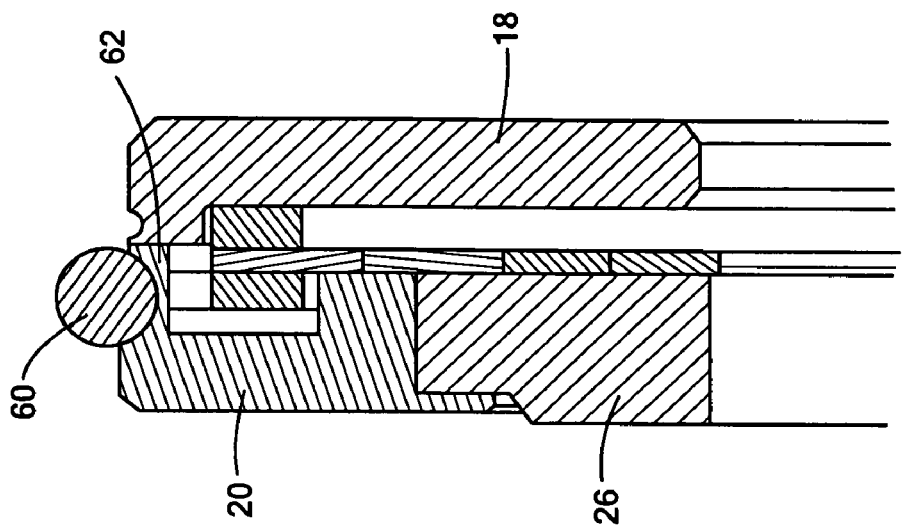
FIG. 8 is a schematic cross-sectional view of the split brush seal shown in FIG. 7.
Figure 7:
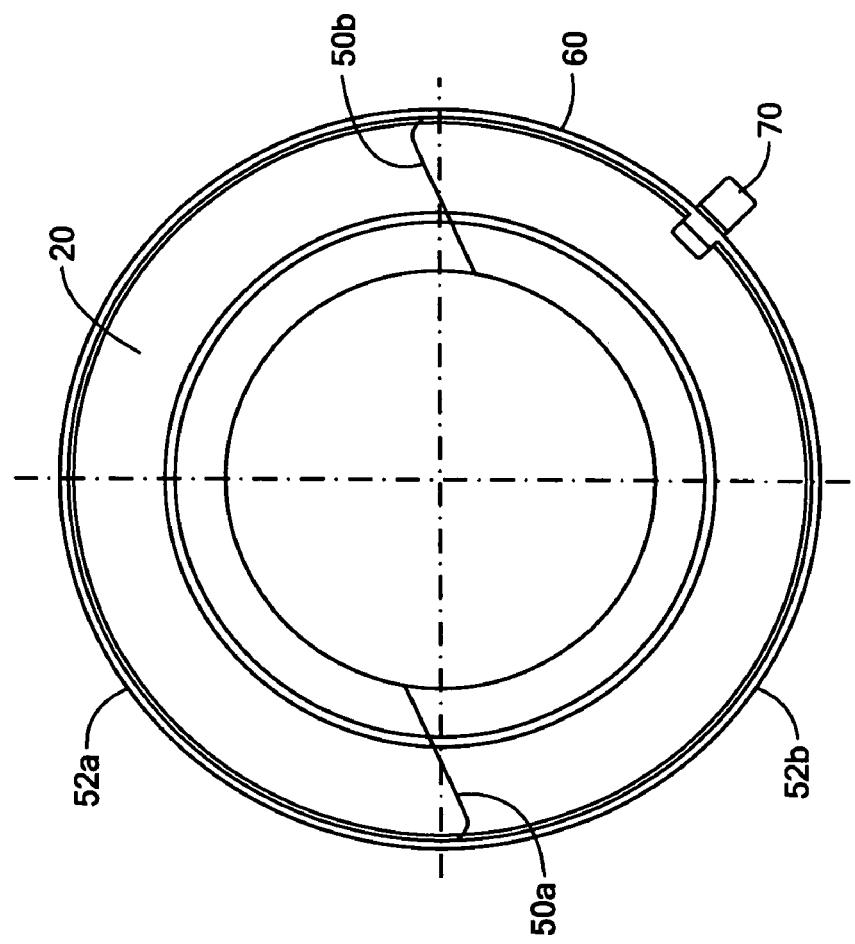
FIG. 7 is a schematic front view of a split brush seal in accordance with the subject invention.

To facilitate installation, brush seal 10, FIG. 1 is typically segmented as shown in FIG. 7 with curved interfaces 50a and 50b to align segments 52a and 52b. To facilitate mounting the brush seal in a machine, splitting the brush seal in segments is a desirable feature. After installation, segments 52a and 52b are joined together. One convenient method of joining the segments together is the use of a garter spring 60, FIGS. 7-8 installed into groove 62 machined into the brush seal outer diameter. The groove can also be located off a shoulder or extension of the segments. Garter spring 60 is fitted into the groove and stretched around the segment. Hooks at each end of the garter spring allows the spring ends to be attached to themselves resulting in a continuous 360° configuration. The radial force supplied by the spring and applied to the segment outer diameter holds the segments together in one unit.

In order to insure that the segments are held in their proper alignment with respect to each other, curved regions 50a and 50b, FIG. 7 are incorporated into the section interface to interlock with a mating section on an adjoining segment. Inward radial force supplied by garter spring 60 forces the two mating faces together properly aligning the segments in the radial direction. The shape of the mating interface or cut line can be any shape which will result in proper radial alignment of the segments. Shapes such as a semi-circle, "V" groove, and "U" groove, or any cut line that changes direction can be used to create radial conformity. In addition to using the cut line to align the segments, a male and female feature in the adjoining segments can also assist in radial alignment.

Proper axial alignment is dependent upon pressure forcing the segments against a face machined into the housing groove. As shown in FIG. 1, seal back plate 20 is forced against machine housing 14. Because the brush seal is allowed to move freely in the radial direction, rubbing occurs at the back plate/housing interface. In order to reduce friction at this interface, the low friction material of rub feature 26 can be extended in the axial direction of the back plate as shown in FIG. 4 to contact the machine housing. This would also reduce the sliding friction between the brush seal and the housing reducing wear. FIG. 7 also shows antirotation tab 70 commonly used in connection with brush seals.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A self centering, floating brush seal assembly comprising:
   a machine housing including a seal channel disposed circumferentially about a rotating shaft;
   a radially floating brush seal disposed in said seal channel but not fixed in the machine housing, the brush seal including:
   a front plate,
   a back plate,
   a plurality of bristles sandwiched between the front plate and the back plate and having an upper end and free radially extending ends disposed circumferentially about and contacting the rotating shaft,
   a pressure channel is formed between the back plate and an axially adjacent surface of the housing that forms a portion of the seal channel; and
   a radially extending rub feature associated with at least one of the front plate and the back plate and also disposed circumferentially about and contacting the rotating shaft,
   wherein the brush seal is centered with respect to said rotating shaft, not the machine housing; a radial gap is formed in the seal channel between the upper end of the bristles and a portion of the machine housing defining an outer radial boundary of the seal channel; and the axial thickness of the rub feature is greater than the axial thickness of the back plate, the rub feature extending beyond a surface of the back plate such that when the rub feature is in axial contact with the axially adjacent surface of the housing, the pressure channel exists between the back plate and the axially adjacent surface of the housing.

2. The assembly of claim 1 in which the rub feature is a ring attached to the back plate.

3. The assembly of claim 1 in which the rub feature is segmented.

4. The assembly of claim 1 in which the rub feature is made of a material exhibiting good tribological properties.

5. The assembly of claim 1 in which the back plate includes an inner diameter channel and the rub feature is disposed in said channel.

6. The assembly of claim 1 in which the rub feature is integral with the back plate.

7. The assembly of claim 1 in which the rub feature extends to or closely proximate to the free ends of the bristles.

8. The assembly of claim 1 in which the back plate includes the rub feature having a face, the rub feature being comprised of low friction material, wherein radial movement of said rotating shaft causes contact between the shaft and rub feature.

9. The assembly of claim 1 in which the rub feature extends over a side of the back plate.

10. The assembly of claim 1 in which the brush seal is segmented to facilitate assembly about a shaft.

11. The assembly of claim 10 further including an outer diameter groove in the brush seal.

12. The assembly of claim 11 further including spring disposed in the groove for securing the segments together.

13. The assembly of claim 10 in which the interface between segments includes a curved portion to align the segments.

14. The assembly of claim 1 further including an antirotation tab.

15. A self centering, floating brush seal assembly comprising:
    a machine housing including a seal channel disposed circumferentially about a rotating shaft;
    a radially floating brush seal disposed in said seal channel but not fixed in the machine housing, the brush seal including:
    a front plate,
    a back plate,
    a plurality of bristles sandwiched between the front plate and the back plate and having free radially extending ends disposed circumferentially about and contacting the rotating shaft, and
    a radially extending rub feature associated with at least one of the front plate and the back plate and also disposed circumferentially about and contacting the rotating shaft,
    wherein the brush seal is centered with respect to said rotating shaft, and the axial thickness of the rub feature is greater than the axial thickness of the back plate; the rub feature extending beyond a surface of the back plate such that when the rub feature is in axial contact with an axially adjacent surface of the housing; and a pressure channel exists between the back plate and the housing.

16. The assembly of claim 15, wherein a radial gap is formed in the seal channel between the upper end of the bristles and a portion of the machine housing defining an outer radial boundary of the seal channel, the radial gap being devoid of a spring or other mechanical element.

* * * * *